US006263060B1

United States Patent
MeLampy et al.

(10) Patent No.: US 6,263,060 B1
(45) Date of Patent: Jul. 17, 2001

(54) TRANSPORTABLE LOGIC TO FACILITATE A LARGE CALLING CARD TRANSACTION NETWORK SUPPORTING DYNAMIC CHANGES

(75) Inventors: Patrick J. MeLampy, Pepperell; Robert F. Penfield, Maynard, both of MA (US); José J. Capó, Pelham, NH (US)

(73) Assignee: Priority Call Management, Inc., Wilmington, MA (US)

(*) Notice: Subject to any disclaimer, the term of this patent is extended or adjusted under 35 U.S.C. 154(b) by 0 days.

(21) Appl. No.: 09/135,607

(22) Filed: Aug. 18, 1998

(51) Int. Cl.⁷ .................. H04M 17/00; H04M 15/00; G06F 17/30
(52) U.S. Cl. .................. 379/144; 379/112; 379/115; 379/229; 707/10; 709/202; 340/825.52
(58) Field of Search .................. 379/112, 113, 379/114, 115, 121, 133, 134, 120, 127, 144, 229; 395/603, 604, 610, 611, 200.32, 200.33; 709/202, 203; 707/3, 4, 10, 100; 340/825.52

(56) References Cited

U.S. PATENT DOCUMENTS

| 4,439,636 | 3/1984 | Newkirk et al. . | |
|---|---|---|---|
| 4,518,824 | 5/1985 | Mondardini . | |
| 4,706,275 | 11/1987 | Kamil | 379/144 |
| 4,860,346 | 8/1989 | Mellon | 379/155 |
| 4,897,870 | 1/1990 | Golden | 379/144 |
| 4,975,942 | 12/1990 | Zebryk | 379/144 |
| 5,155,342 | 10/1992 | Urano . | |
| 5,163,086 | 11/1992 | Ahearn et al. . | |
| 5,168,446 | * 12/1992 | Wiseman | 364/408 |
| 5,226,073 | 7/1993 | Albal et al. . | |
| 5,359,642 | 10/1994 | Castro . | |
| 5,408,519 | 4/1995 | Pierce et al. . | |
| 5,577,109 | 11/1996 | Stimson et al. | 379/112 |
| 5,621,787 | 4/1997 | McKoy et al. | 379/144 |
| 5,696,906 | 12/1997 | Peters et al. . | |
| 5,712,908 | * 1/1998 | Brinkman et al. | 379/119 |
| 5,721,768 | 2/1998 | Stimson et al. | 379/114 |
| 5,734,705 | * 3/1998 | Schlossman et al. | 379/117 |
| 5,740,229 | * 4/1998 | Hanson et al. | 379/67.1 |
| 5,749,075 | 5/1998 | Toader et al. . | |
| 5,815,560 | * 9/1998 | Kaisai et al. | 379/114 |
| 5,978,577 | * 11/1999 | Rierden et al. | 395/610 |
| 6,038,309 | * 3/2000 | Ram et al. | 379/229 |

* cited by examiner

Primary Examiner—Curtis Kuntz
Assistant Examiner—Binh K. Tieu
(74) Attorney, Agent, or Firm—Thomas, Kayden, Horstemeyer & Risley, LLP (57) ABSTRACT

A dynamic transaction network having a management station, a terminal, and a database. In response to a transaction request from a caller, the terminal accesses information stored in the database via transportable logic. The transportable logic derives the location of relevant information in the database array from input characteristic(s) of the transaction request. The transportable logic stored in the terminal is updated with transportable logic stored in the management station if the terminal determines that there is a difference between its transportable logic and the management station's transportable logic. Some differences may include a change in the number of databases on the network, a change in the number of terminals on the network, or a change in the location of the information stored on the database.

62 Claims, 11 Drawing Sheets

TRANSPORTABLE LOGIC TO FACILITATE A LARGE CALLING CARD TRANSACTION NETWORK SUPPORTING DYNAMIC CHANGES

FIELD OF THE INVENTION

The present invention relates generally to the field of electronic transaction processing, and more specifically to the field of real time transaction processing for pre-paid calling card accounts.

BACKGROUND OF THE INVENTION

Real time transaction processing networks are generally comprised of two major components: transaction entry terminals (such as clients in a client-server computer network) and transaction management databases (servers). Transaction networks utilize different kinds of terminals and databases for different industries, such as banking and telecommunications. However, unlike the world's financial systems, no industry-wide standards have been adopted for interoperability in the calling card industry.

Available calling card transaction networks use telephones connected to voice processing systems as terminals, wherein the voice processing system prompts for an account or PIN number (with an optional password). Large databases for transaction management are used to validate the account and prevent simultaneous use. Typically, the PIN or account numbers are either randomly assigned, or are picked by the consumer. Often the PIN number contains some portion of an existing telephone number. However, since there is no widely accepted standard for assigning account and PIN numbers, integrating various calling card networks to interoperate has proven extremely difficult for the telecommunications industry.

With the advent of pre-paid telephone calling card services, database servers have been adapted to manage an active balance, with provisions to prevent the account balance from accruing a negative balance. Since pre-paid vouchers are typically sold at retailers and then discarded, the number of active accounts can number in the hundreds of millions. Extremely large, real time data processing and management requirements therefore provide an additional concern for the pre-paid market. Due to limitations of database technology very often multiple databases are required to manage the transaction volume, leading to interoperability and data accuracy problems. There is therefore a need for expansion of the available database technology to accommodate growing transaction and data volume in the calling card and related industries.

The present invention is intended to address the shortcomings of the available transaction processing capabilities for Pre-Paid Calling Card (PPCC) networks, but is applicable to all transaction processing networks. Two particular shortcomings of available PPCC networks addressed by the present invention include: 1) the terminals' ability to determine and contact a database server for authorization/debit/credit of a specific account is not easily altered or updated; and 2) the terminals' ability to be made aware of and contact new database servers for expansion is not easily changed. This second shortcoming stems from two particular features of available transaction processing systems: first, the lack of dynamic redistribution of existing account data creates the need for downtime; and second, a knowledge of database specifics schemas) is required to interact with each database.

While the above issues are problematic for the all traditional transaction processing networks, they are especially difficult to overcome in PPCC networks because of the real-time aspects of the balance management requirements. Thus, it is nearly impossible to restructure a PPCC database off-line, and then post transactions to catch up to real time as is the practice in "post-pay" or legacy-based financial accounting situations.

Glossary

The following definitions and acronyms will assist the reader in comprehending the enclosed description of the present invention:

| | |
|---|---|
| DTL | Dynamic Transportable Logic; |
| IE | Information Element; |
| IEC | Information Element Collection; |
| IP | Internet Protocol; |
| SS7 | Signaling System Seven; |
| OLTP | On-Line Transaction Processing; |
| Fragment | A "sub-section" of a database; |
| Host | A single computing element; |
| Cluster | A group of computing elements; |
| Network | A group of clusters. comprising an entire operating network. |

SUMMARY OF THE INVENTION

To address the shortcomings of the available art, the present invention provides a dynamic transaction network having a management station, a terminal, and a database. In response to a transaction request from a caller, the terminal accesses information stored in the database via transportable logic. The transportable logic derives the location of relevant information in the database array from input characteristic(s) of the transaction request. The transportable logic stored in the terminal is updated with transportable logic stored in the management station if the terminal determines that there is a difference between its transportable logic and the management station's transportable logic. Some differences may include a change in the number of databases on the network, a change in the number of terminals on the network, or a change in the location of the information stored on the database.

A first advantage of the present invention is the distribution of dynamic transportable logic ("DTL"), enabling terminal equipment to contact a large, distributed, and heterogeneous array of data servers, utilizing only information available at a terminal.

Another advantage of the present invention is the provision of a mechanism for updating DTL such that the topology of a transaction network can change "on the fly" in a manner based only upon information available at a terminal.

Still other advantages of the present invention include: the provision of multiple DTL types, in a manner based upon a physical aspect of the terminal in use (such as the department the terminal is in or the telephone number dialed on the terminal); the ability to add new database servers to a network in real time; the ability to obtain addresses and capabilities of all data servers available for transactions such that each terminal can interact on secure networks; the provision of built-in security mechanisms to permit public network transactions; through the use of DTL and distributed processing, the ability to build very large transaction networks with scalable performance which will meet any transaction network requirements; utilization of open transport technology to ensure modification of the networking technology to support at least IP and SS7 networks; utilization of Information Element ("IE") datums to provide for data storage within any computing architecture; utilization of Information Element Collections (IECs) to permit multiple versions of terminal software to share a common data storage facility; the provision of a mechanism for fragmenting databases into a very large number of logical fragments, which, taken together, can represent physical fragments.

A further advantage of the present invention includes a dynamic transaction network having a management station containing transportable logic (prism logic) that facilitates access to the dynamic transaction network, a database connected to the management station through a communications medium, the database having at least one database fragment stored therein, and a terminal connected to the management station through the communications medium, the terminal receiving the transportable logic from the management station upon initialization of the dynamic transaction network, the terminal accessing the database fragment via the transportable logic in response to a transaction request from a user.

A still further advantage of the present invention includes a dynamic transaction network having a management station containing system configuration data that defines the dynamic transaction network and Dynamic Transportable Logic (DTL) that facilitates access to the dynamic transaction network, a database connected to the management station through a communications medium, the database having at least one database fragment stored therein, and a terminal connected to the management station through the communications medium, the terminal receiving the system configuration data and the DTL from the management station upon initialization of the dynamic transaction network, the terminal accessing the database fragment via the DTL in response to a transaction request from a user.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings in which.

DETAILED DESCRIPTION OF THE DRAWINGS

A brief discussion of the term "database fragments" is required to understand the operation of the present invention. A database fragment is a "logical section" of a database. Thus, a single data server may initially serve hundreds of "logical fragments", which may ultimately grow to occupy hundreds of data servers. Thus, the data unit is a fragment which, over time, may be moved from one physical server to another, or to a plurality or servers. The determination of which data fragment to access at a given time is part of the functionality of dynamic transportable logic. Thus, where each DTL has a plurality of inputs and outputs, at least one of the outputs comprises the "logical fragment" address to use for database functionality.

Another significant term worthy of preliminary explanation is "transaction network", each of which comprises three building blocks: the management station or SMP (System Management Point), the terminal or SSP (Service Switching Point), and the database or SCP (Service Control Point). The SMP is the central network configuration manager for a transaction network. The SMP provides central control and distribution of all DTL and network topologies. Additionally, the SMP provides monitoring and control functionality. SSPs are the actual switches which function as the entry point for all services offered in a PPCC network. The SCPs are the distributed databases utilized to control and dictate the services provided during transactions. These three pieces function together to embody a distributed scalable transaction network. The operation of this network, and how it provides dynamic management or transaction processing, is described in detail below.

Figure 1:
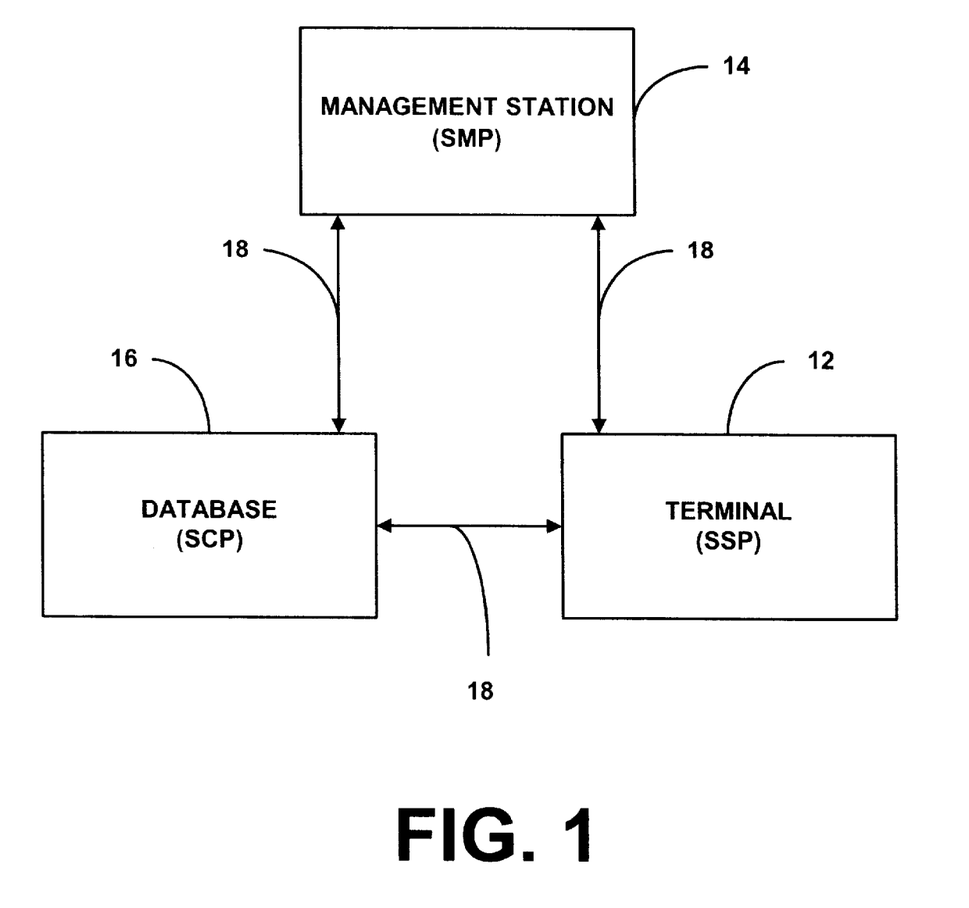
FIG. 1 is a diagrammatic view of the dynamic transaction network of the present invention.

Referring now to FIG. 1, a minimal network configuration 10 is shown. The minimal network configuration 10 is typically the initial configuration encountered upon initialization of the dynamic transaction network. The network 10 includes a terminal or SSP 12, a management station or SMP 14, a database or SCP 16, and a communication medium 18 interconnecting the SSP 12, SMP 14, and the SCP 16. Messages on the network are assumed to result from a reliable datagram method, such as the method discussed in W. Richard Stevens, UNIX Network Programming, Prentice Hall, 1990, pp 405–419, incorporated herein by reference thereto.

Figure 2:
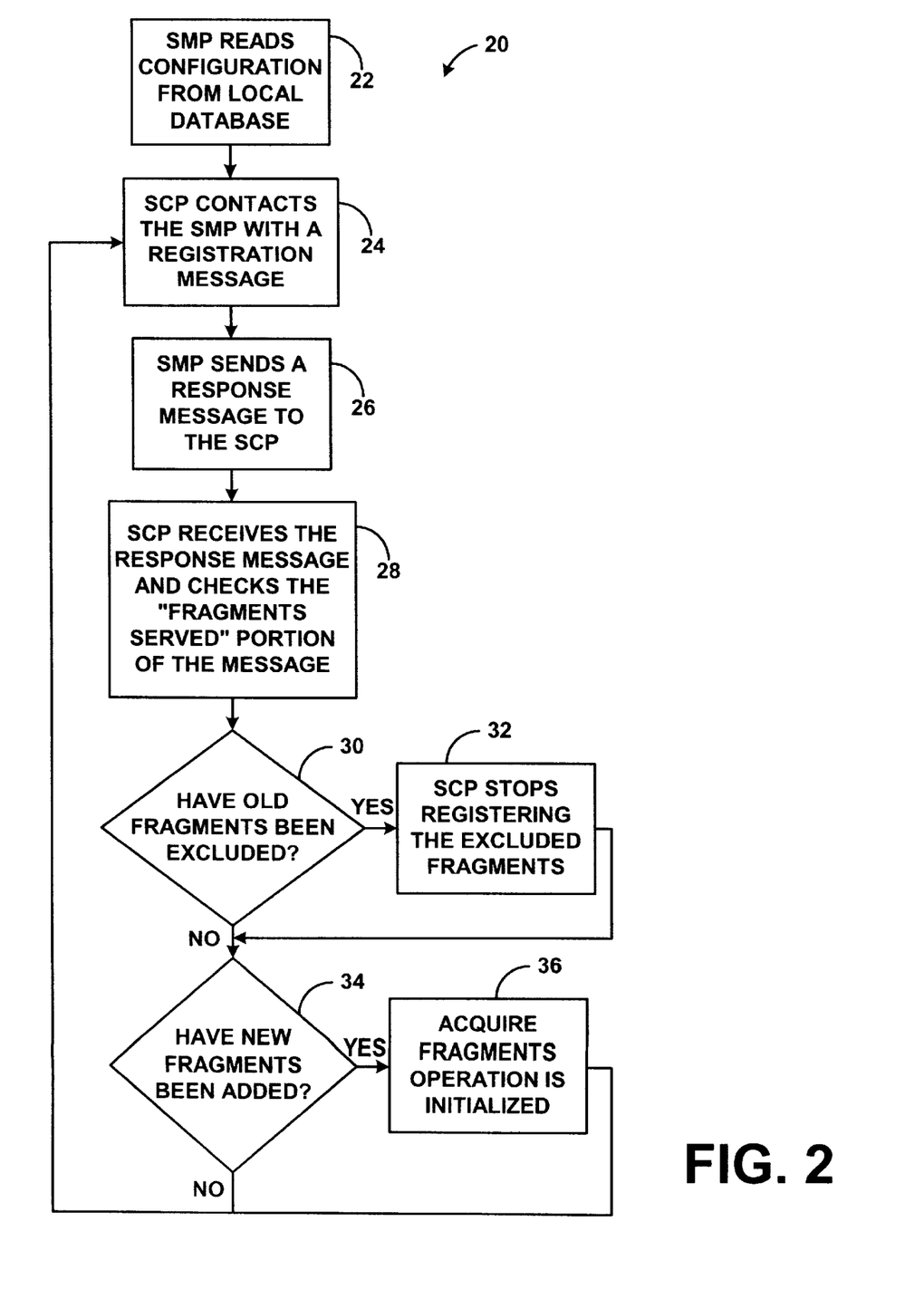
FIG. 2 is a flowchart illustrating a method of configuration for an SCP of the present invention.

Referring now to FIG. 2, the method of configuration 20 for an SCP is shown. Upon startup of the transaction network, at step 22, the SMP is not configured so the SMP reads its configuration from a local database. Afterwards, at step 24, the SCP contacts the SMP with a registration message or PING signal using a reliable datagram. It should be noted that the SCP periodically contacts the SMP with a PING signal to ensure that the SCP is storing all necessary configuration data, as described in further detail below. The PING signal lists the data fragments supported by the SCP, as well as operational statistics of the SCP for monitoring purposes. The list of supported fragments is essentially a registration message indicating which database services are supported by the SCP. The operational statistics may include, for example, transactions per second, available memory, and alarm data. The PING signal also includes a Configuration Journal Number (CJN) that represents the number of configuration transactions that have occurred since network installation. The CJN integer can be used to check the accuracy of the distributed configuration data.

Next, at step 26, the SMP responds to the SCP with a message containing a complete list of SCPs (including database servers and their addresses), information about which "fragments" of the account population are served, the current service state of each server, and a CJN integer which can be used to check the accuracy of the distributed configuration data. The message also preferably includes a complete list of the SSPs connected to the dynamic transaction network.

After the SCP receives the response from SMP, the SCP, at step 28, checks the "fragments served" portion of the response against the SCP's local record. If the fragments served have changed to exclude old fragments, at step 30, then the server stops registering for those fragments at step 32. If there are new fragments that were not in the previous list, at step 34, then an "acquire fragment" operation is initiated at step 36. The "acquire fragment" operation is directed to the previous owners (SCPs) of the new fragments.

The SCP periodically repeats steps 24–36 to ensure that the SCP is storing all necessary configuration data, i.e., whether the SCP should stop registering excluded fragments and/or acquire new fragments.

Figure 3:
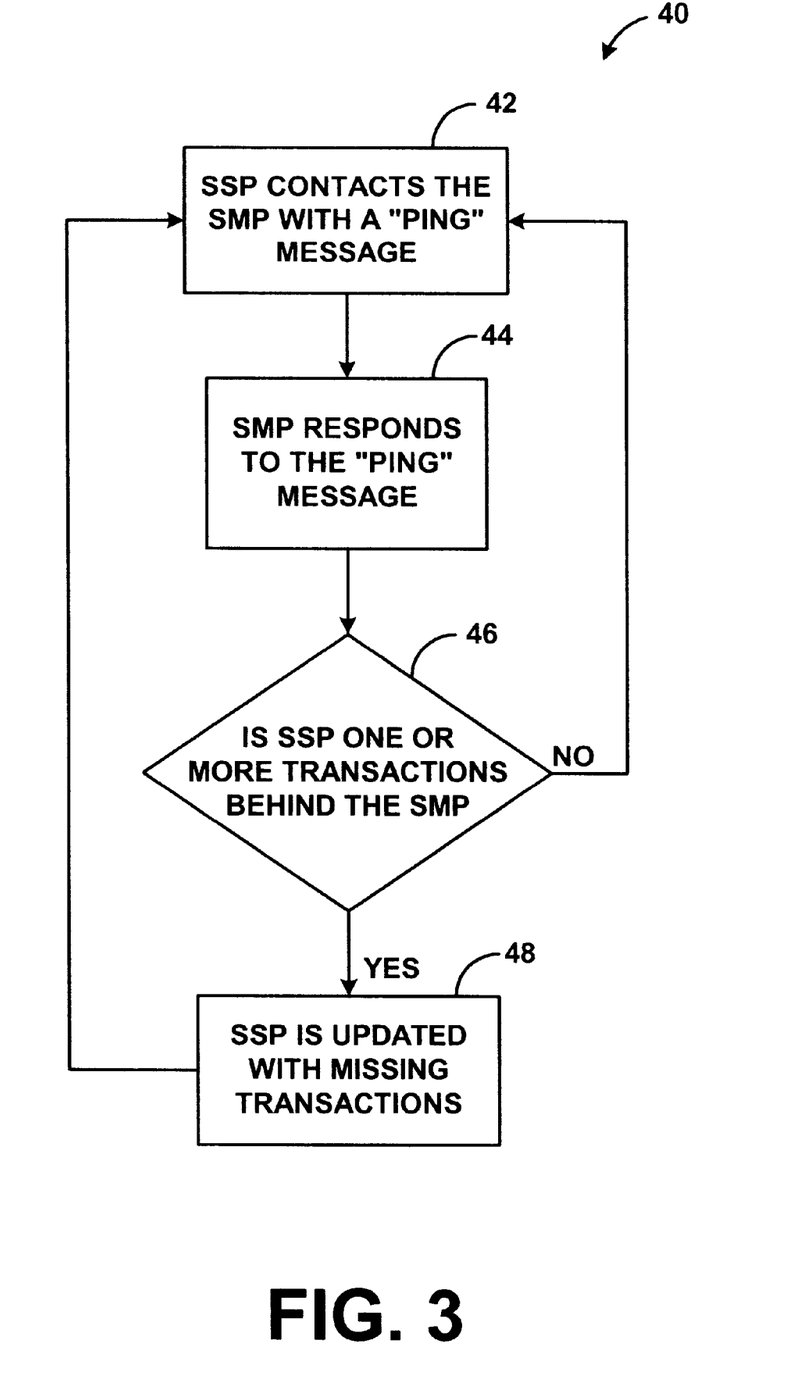
FIG. 3 is a flowchart illustrating a method of configuration for an SSP of the present invention.

The SSP undergoes a configuration process 40 after the SCP configuration is completed, as shown in FIG. 3. Initially, at step 42, the SSP contacts the SMP with a PING message. The PING message includes operational statistics for monitoring purposes. The operational statistics include, but are not limited to, calls per hour, memory available, disk space, and alarms. The PING message also includes a CJN integer containing the number of configuration transactions that have occurred since network installation. As previously explained, the CJN integer can be used to check the accuracy of the distributed configuration data.

Next, at step 44, the SMP responds to the SSP's PING message with a CJN, a complete list of database servers and their addresses, an indication of which "fragments" of the account population are served, the current service state of each fragment, and a complete list of the SSPs connected to the dynamic transaction network.

Afterwards, at step 46, the SSP determines if its configuration database is one or more transactions behind the SMP. If the SSP configuration database is not behind the SMP, the SSP returns to step 42 and transmits a PING message to the SMP after the lapse of a predetermined period of time. If the SSP configuration database is behind the SMP, the SSP sends a request to the SMP for the missing journal entries. After the SMP replies with the missing journal entries, the SSP is updated with the missing transactions at step 48. The journal entries are preferably applied to the local database and served to other hosts on the cluster, thereby ensuring that all hosts (computing entities) in all clusters store an identical copy of the configuration database. After updating is complete, the SSP returns to step 42 and transmits a PING message to the SMP after the lapse of a predetermined period of time.

The above-described process repeats continually, with an interval having a programmable length between PING messages. The latency of configuration data updates is therefore based solely upon the frequency of the PING message. It should be noted that the SCP also updates missing transactions using the method shown in FIG. 3.

Figure 4:
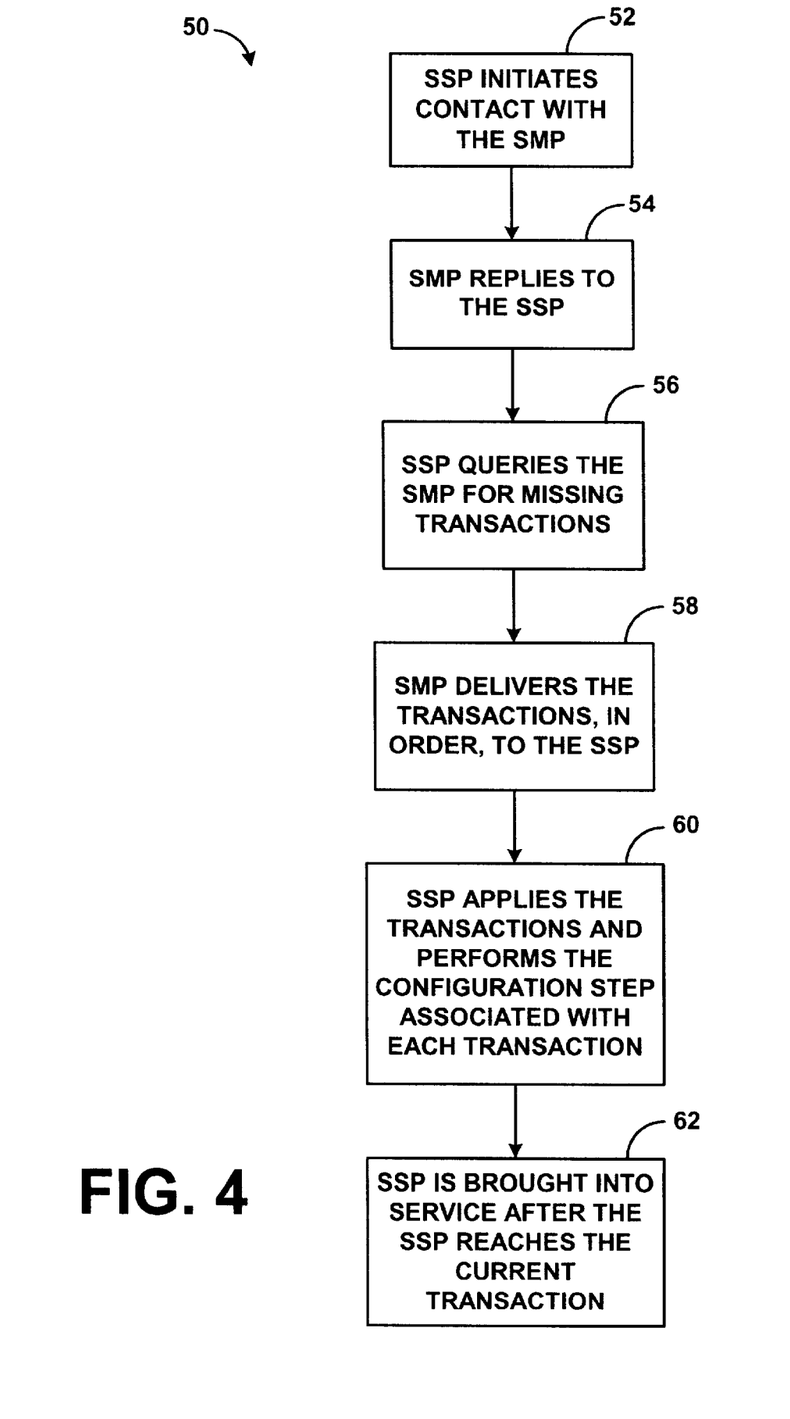
FIG. 4 is a flowchart illustrating a method of adding a new SSP to the dynamic transaction network of the present invention.
Figure 5A:
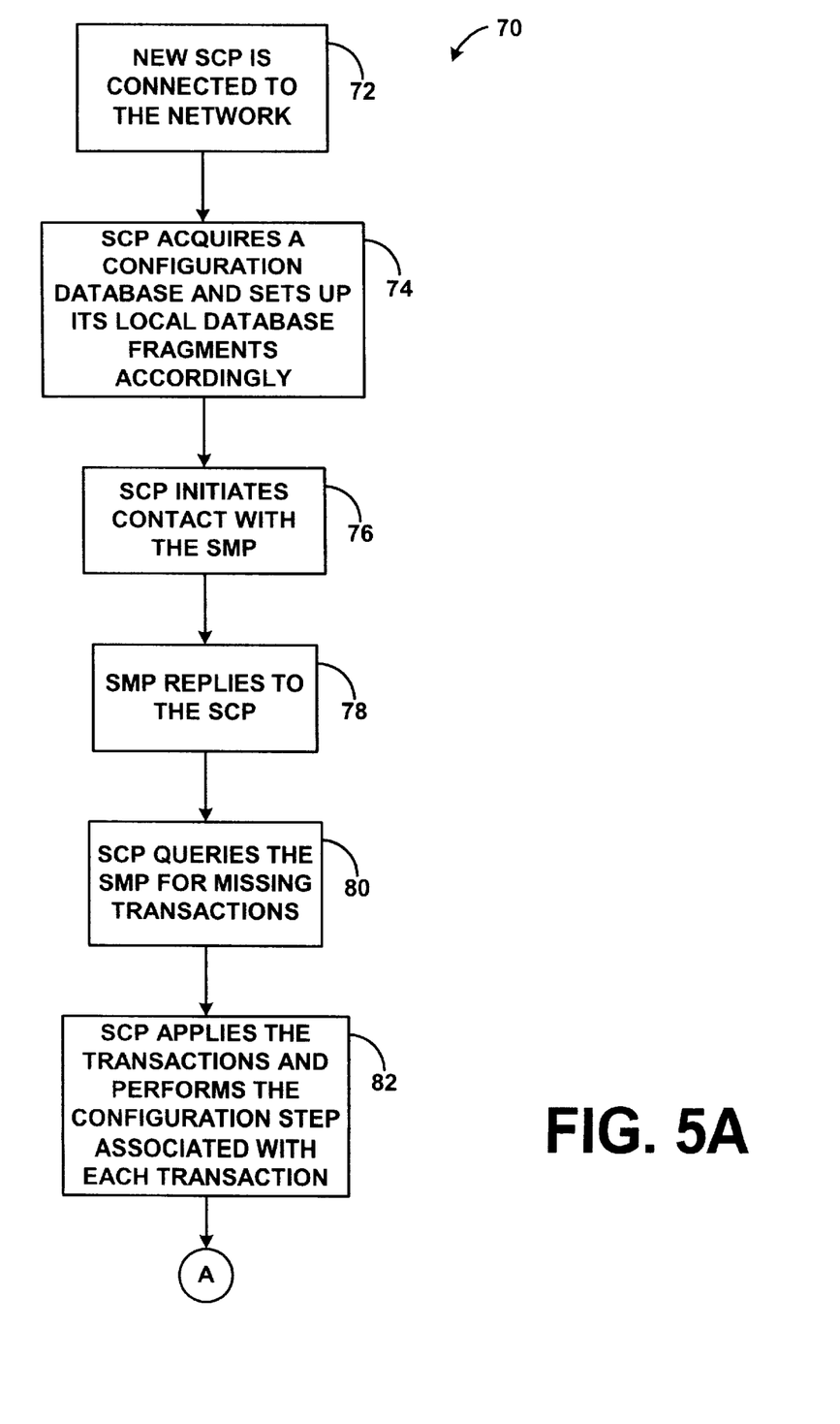
FIGS. 5A, 5B and 5C are flowcharts illustrating a method of adding a new SCP to the dynamic transaction network of the present invention.
Figure 5B:
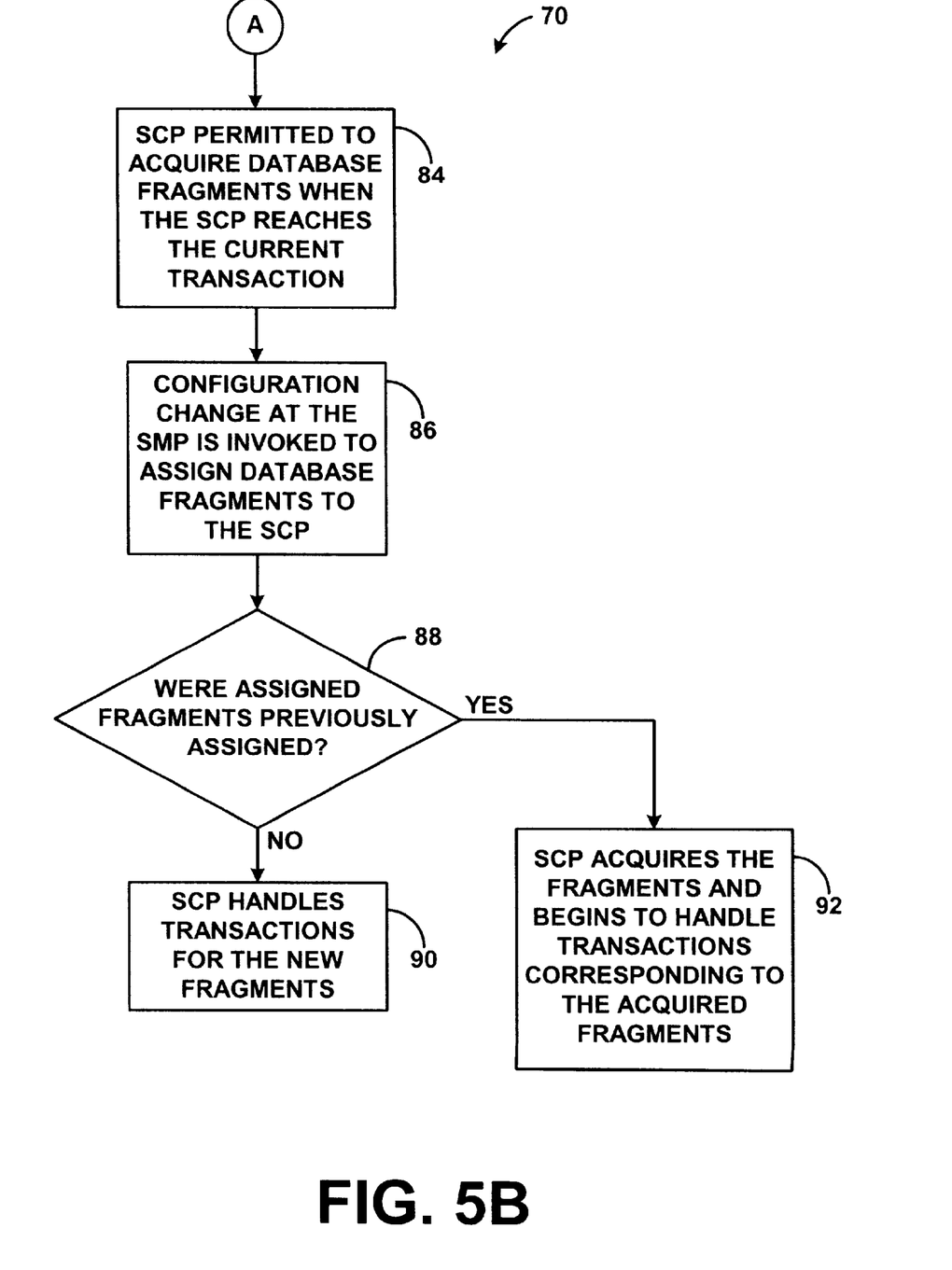

Referring now to FIG. 4, a method 50 for adding additional SSPs (transaction terminals) to the dynamic transaction network is shown. The newly added SSP (e.g., computing entity or cluster) does not need to have any particular configuration prior to the inclusion of the SSP into the dynamic transaction network. First, at step 52, the new SSP initiates contact with the SMP by transmitting a journal entry number of zero, indicating no configuration, to the SMP. Next, at step 54, the SMP replies to the new SSP by transmitting a current journal entry number "n" for the running network. Afterwards, at step 56, The SSP queries the SMP for each transaction in order from journal entry number "1" to journal entry number "n". Then, at step 58, the SMP delivers the transactions to the SSP. Afterwards, at step 60, the SSP applies the transactions and performs the configuration steps associated with the transactions in real time. One example of a real time transaction is copying custom voice prompts. When the SSP reaches the current configuration transaction number, at step 62, the SSP is brought into service. Referring now to FIGS. 5A and 5B, a method for adding additional SCPs (database servers) to the dynamic transaction network is shown. Initially, at step 72, the new SCP (without any configuration) is connected to the network. Next, at step 74, the new SCP acquires a configuration database and sets up its local database fragments based on the existing configuration provided by the configuration database. Afterwards, at step 76, the new SCP initiates contact with the SMP by transmitting a journal entry number of zero to the SMP. A journal entry number of zero indicates that the new SCP does not have a configuration. The SMP, at step 78, replies to the new SCP with the current journal entry number "n" for the running network. Next, at step 80, the SCP queries the SMP for each transaction, in order, from journal entry number "1" to journal entry number "n". Afterwards, at step 82, the SCP applies the transactions and performs the configuration steps associated with the transactions in real time. One example of a real time transaction is copying custom voice prompts, as previously discussed.

When the SCP reaches the current configuration transaction number, at step 84, the SCP can begin to acquire fragments. Depending upon the initial configuration, the SCP may have no logical fragments. If so, at step 86, a configuration change at the SMP is invoked to assign logical fragments to the new SCP. The new SCP, at step 88, determines whether the assigned fragments were previously assigned to existing SCPs. This determination step is made to evaluate whether a migration of a fragment from another SCP to the new SCP is required. If the assigned fragment was not previously assigned, the new SCP, at step 90, handles any transactions corresponding to the fragment. If the assigned fragment was previously assigned, then an acquire fragment operation is initiated, at step 92, and the new or target SCP immediately begins to handle transactions for the assigned fragment. If the fragment is in the process of being acquired, transaction requests for fragment records not already acquired will be forwarded to the previous fragment manager or source SCP (which recognizes that there is a new fragment manager or target SCP). The source SCP's response to the forwarded transactions is then transmitted back to the original requestor. The target SCP acquires previously assigned fragment entries by polling the previously responsible SCP for each record and deleting each record from the source SCP as the target SCP progresses through the logical fragments.

Figure 5C:
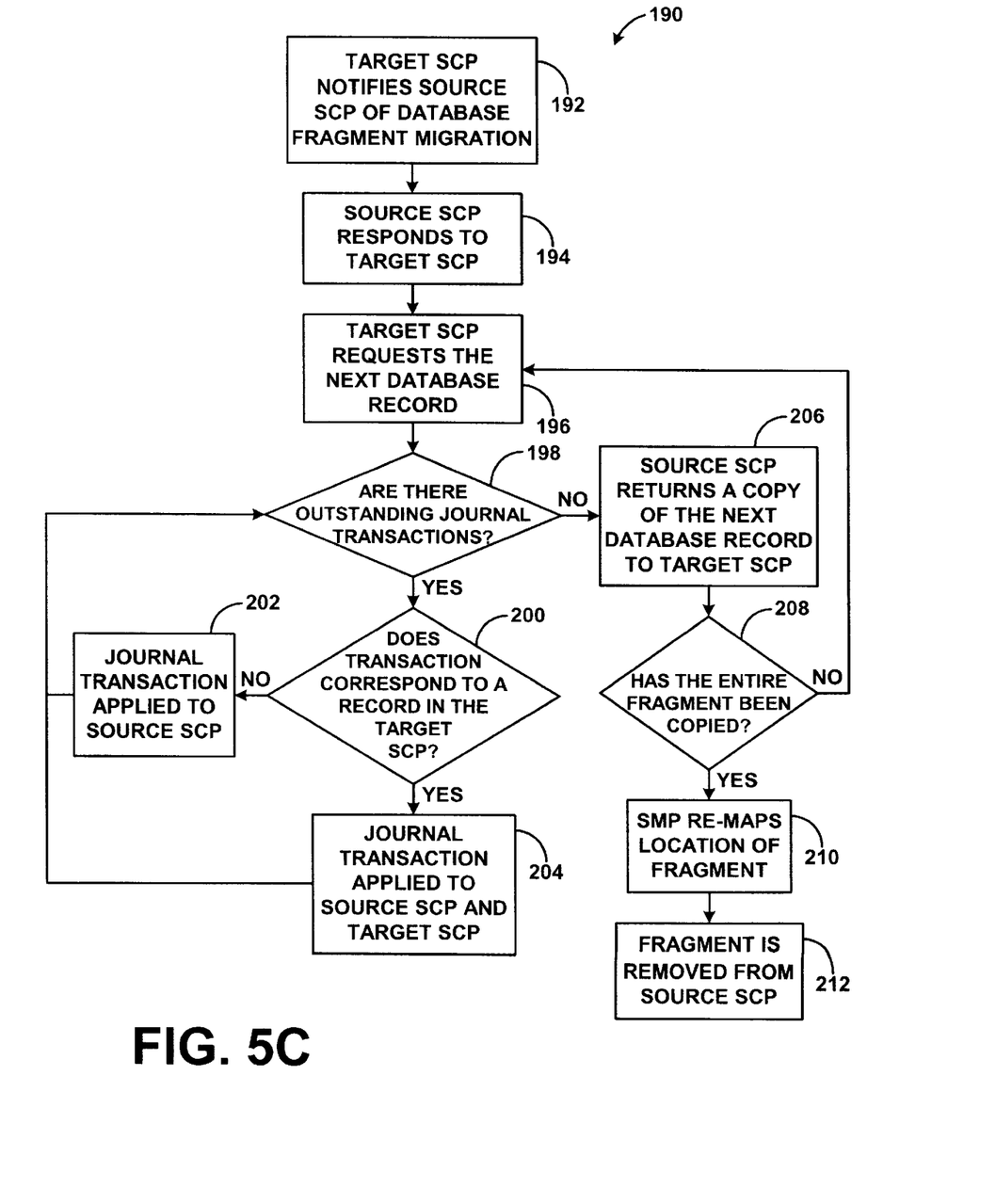

Referring now to FIG. 5C, an alternative method 190 of database fragment migration is shown. Initially, at step 192, the target SCP notifies the source SCP of the migration of a database fragment (e.g., fragment 3). Next, at step 194, the source SCP responds to the target SCP by providing the target SCP with a journal entry number (e.g, 1003) and a copy of the first database record in the migrating database fragment. After the target SCP receives the first database record, the target SCP, at step 196, request the next database record for the migrating database fragment. Before sending the a copy of the next database record, the source SCP, at step 198, determines if there are any outstanding journal transactions (e.g., 1004, 1005, etc . . . ). If there are outstanding journal transactions, the target SCP, at step 200, is checked to determine if it has copied a database record that corresponds to an outstanding journal transaction. If the target SCP does not contain a corresponding database record, the journal transaction, at step 202, is applied to the source SCP, and the source SCP, at step 198, determines if there are additional outstanding journal transactions. If the target SCP contains a corresponding database record, the journal transaction, at step 204, is applied to the source and target SCPs, and the source SCP, at step 198, determines if there are additional outstanding journal transactions. It should be noted that this method ensures that the source and target SCPs contain identical copies of a database fragment after the database fragment migration is completed. It should also be noted that the source SCP is on-line through the migration procedure and if, during the migration procedure, the source SCP or the target SCP fail for any reason, the migration procedure can be restarted from the last transaction copied.

If there are no outstanding journal transactions, the source SCP, at step 206, returns a copy of the next database record to the target SCP. Next, at step 208, the target SCP determines if the entire database fragment has been copied. If not, the target SCP, at step 196, requests the next database record. If so, the SMP, at step 210, re-maps the location of the fragment from the source SCP to the target SCP. Afterwards, at step 212, the database fragment is removed from the source SCP.

It should be noted that any number of fragments may be referenced. It is solely up to the DTL to determine what the "fragment number" to use should be. Since the DTL can be replaced on the fly (as described below), fragment name space can be expanded or contracted during operation of the system. Thus any limitations on the number of database fragments would be derived from the number of addressable network end points.

Furthermore, the number of transactions per second enabled for the entire network can be quite massive. Since the number of SSPs is limited only by the number of available SCPs and addressable fragments, the number of SSPs is also equal to the number of addressable network end points. Thus, the total theoretical throughput of a system implemented using the structure and function of the present invention is highly scalable and virtually limitless.

However, the speed with which configuration changes are accommodated may be more of a limiting factor on total system throughput. Nonetheless, a nested configuration hierarchy is preferably included to provide further configuration transaction throughput. To minimize configuration transactions, the nested configuration hierarchy permits the forwarding of configuration changes to SSPs and SCPs only as required.

When an SSP needs to perform a transaction (e.g., check and update a balance for a particular calling card), the SSP will execute its DTL logic, using the on-line transaction processing technique described below, to determine which logical fragment to use for the transaction. If the selected logical fragment has an ACTIVE service state, then a transaction request is created and sent to the SCP currently managing the logical fragment. The managing SCP then directly communicates with the requesting SSP when responding to the transaction request.

Turning next to On-Line Transaction Processing (OLTP), it should be noted that a key mechanism for utilizing the distributed database technology of the present invention is a combination of distributing and managing the configuration data, as well as distributing and utilizing the DTL for interfacing with the transaction network. The DTL of the present invention is best described as a dynamically replaceable "prism" which reflects the rays of transactions to their correct locations during network use.

Computer languages such as Sun Microsystem's JAVA have been developed to distribute executable logic from servers to clients for execution. The DTL envisioned and described herein for use with present invention has similar functionality. In fact, Java would be an excellent candidate for this role. Other available DTL mechanisms include Pearl Penquin, Bell Labs Interferon, and ActiveX from Microsoft. Substitution and inclusion of any of these languages and methods of distribution would be understood by those skilled in the art to which the present invention pertains.

Figure 6:
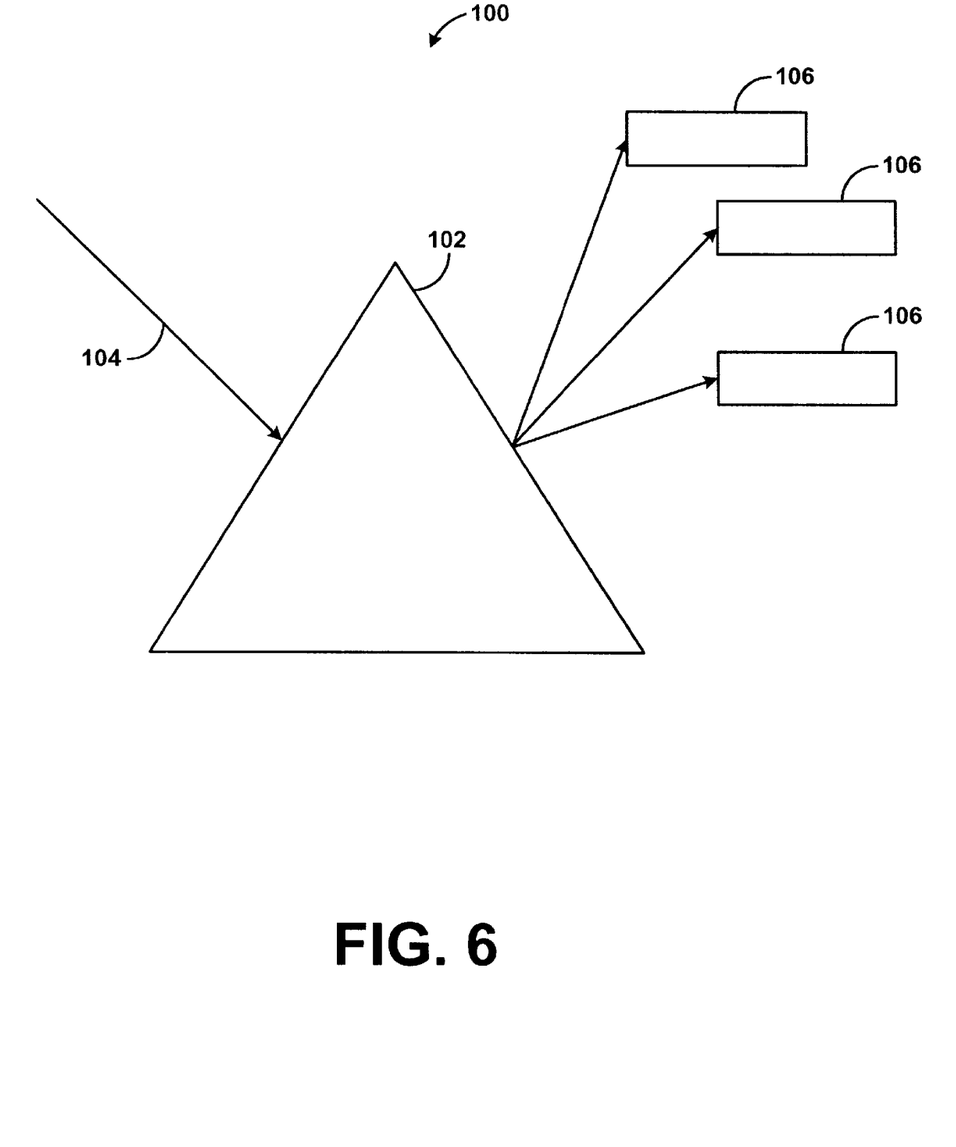
FIG. 6 is a diagrammatic view of the Dynamic Transportable Logic (DTL) of the present invention.

Referring now to FIG. 6, a "prism" diagram 100 illustrating the functionality of a DTL element 102 is shown. As shown, the DTL element or algorithm 102 directs an incoming transaction 104 to an SCP 106 that corresponds to the input characteristics of the incoming transaction 104. More specifically, the DTL element 102 uses one or more of the following input characteristics to direct the transaction request. An Automatic Number Identification (ANI) which provides the source number of an inbound call to the host SSP. A Dialed Number Identification System (DNIS) code that provides the number dialed by the caller to reach the host SSP. An originally called number (OCN) that provides a number dialed before the call arrived at the host SSP. (It should be noted that the OCN is also sometimes referred to as the Redirect Number). A PIN or account number inputted by a user. (The PIN or account number is usually DTMF or spoken words processed into digits by the SSP). A physical port or circuit that a call arrives on. Information digits that provide an indication of what kind of terminal the caller is dialing from (e.g., a pay phone, hotel phone, or prison phone).

When determining which path to direct the incoming transaction, the DTL element generates a number of output signals. One output is a logical fragment address in the form of an integer value denoting the database location in which a record, necessary for the transaction, resides. Another output is an account or pin number that comprises a digital database key that allows a transaction to gain access to records in a database. A further output may be an optional password containing a user changeable PIN or account number in the form of an embedded code. It should be noted, however, that the optional password is not part of the database key.

The DTL element preferably has built in decryption and check sum mechanisms to prevent invalid transactions from ever reaching the central servers (SCPs). Since the database key and the database fragment location are determined by the DTL and checksums and decryption are included in the DTL, the final transaction can be private key encrypted for transport to the central servers (SCPs) in order to securely use a public network to carry the final transaction.

Figure 7:
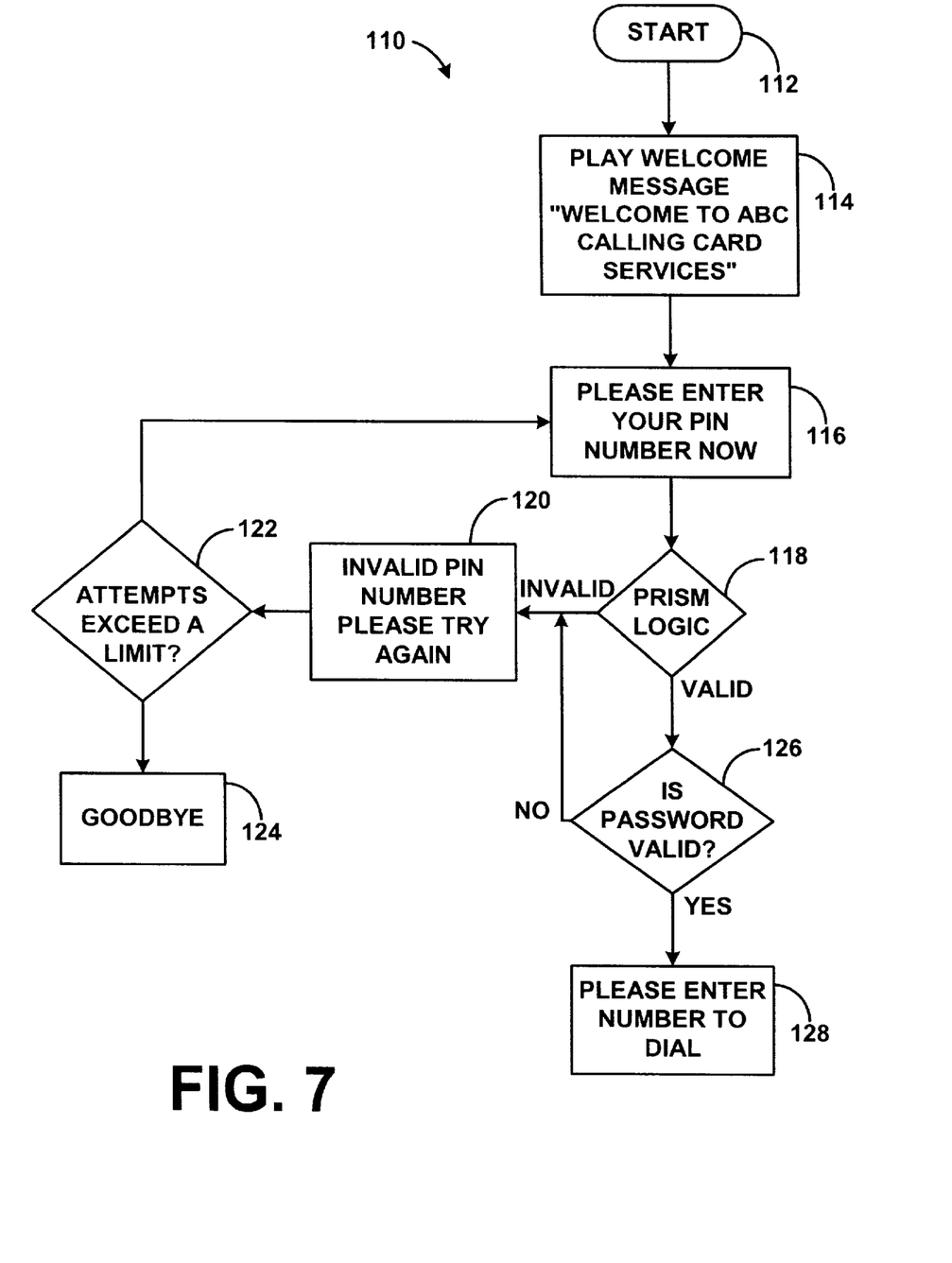
FIG. 7 is a flowchart illustrating calling card call flow in the dynamic transaction network of the present invention.

Referring now to FIG. 7, a method 110 of calling card call flow is shown. Initially, at step 112, an SSP receives an incoming call. The SSP responds to the incoming call by playing a welcome message, at step 114, and prompting the caller, at step 116, for the caller's PIN number. After receiving the PIN number, the SSP, at step 118, transmits the incoming call characteristics (including the PIN number) to its prism logic. Next, if the prism logic (of step 118) determines that the entered PIN number is invalid, the SSP, at step 120, informs the caller that the entered number is invalid and, at step 116, prompts the user to re-enter the PIN number. However, if the SSP, at step 122, determines that the number of caller attempts to enter a PIN number exceeds a predetermined limit, the SSP transmits a "goodbye" message, at step 124, and disconnects the call. If the prism logic (of step 118) determines that the PIN number is valid, the SSP, at step 126, evaluates a password inputted by the caller (see FIG. 9). If the password is invalid, the SSP, at step 120, informs the caller that the entered number is invalid and, at step 116, prompts the user to re-enter the PIN number. However, if the SSP, at step 122, determines that the number of caller attempts to enter a PIN number exceeds a predetermined limit, the SSP transmits a "goodbye" message, at step 124, and disconnects the call. If the entered password is valid, the SSP, at step 128, prompts the caller for the phone number that the caller wants to dial.

Figure 8:
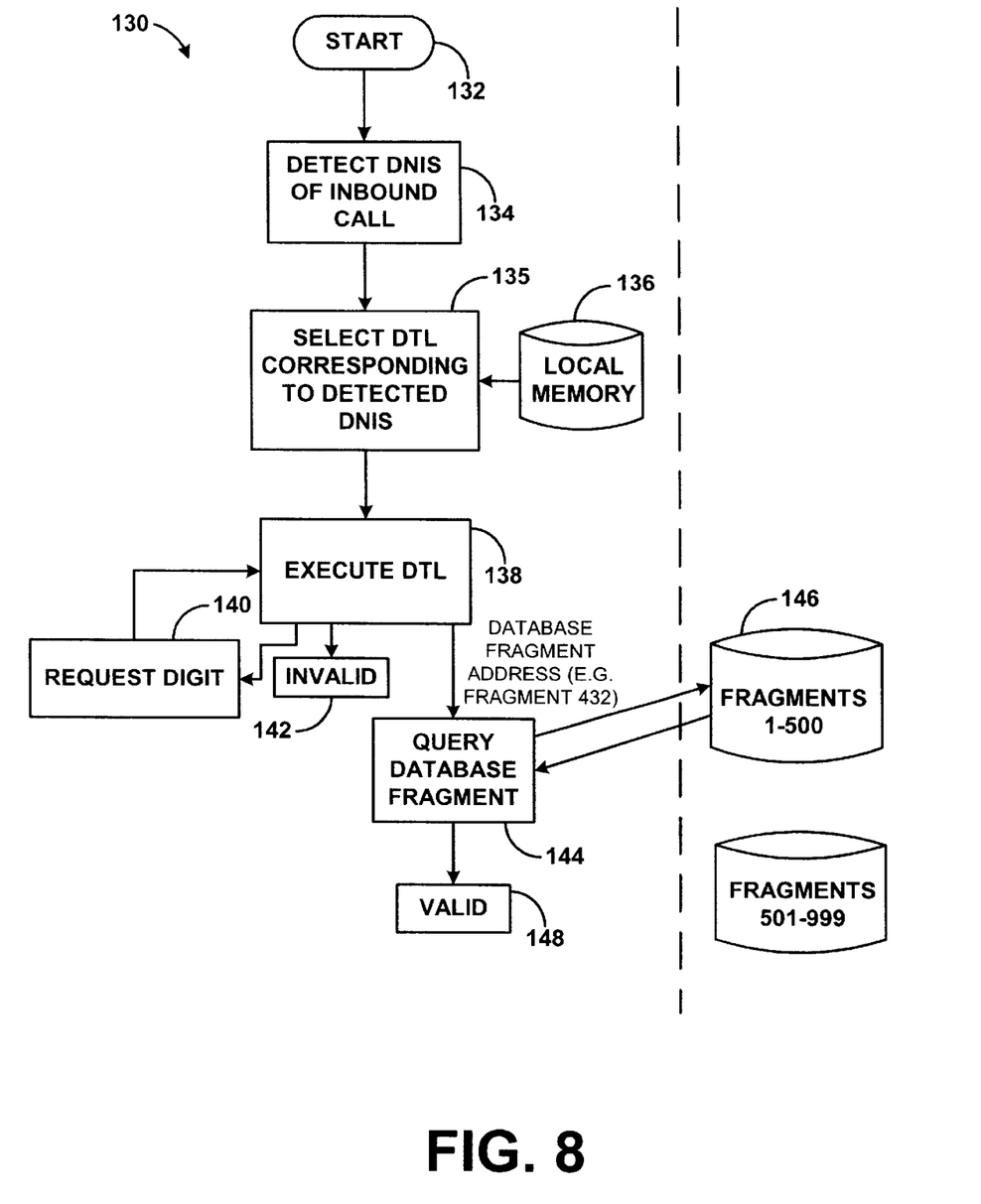
FIG. 8 is a flowchart illustrating the prism logic's functionality in the dynamic transaction network of the present invention.

Referring now to FIG. 8, an example of the prism logic's functionality 130 is shown. Initially, at step 132, the prism logic receives a set of incoming call characteristics from the SSP (FIG. 7, step 118). Next, at step 134, the prism logic detects the DNIS of the inbound call and, at step 135, selects the DTL corresponding to the DNIS from a local memory 136 of the SSP. As previously described, the local memory 136 of the SSP is periodically updated by the SMP. Once the DTL has been selected, the prism logic, at step 138, executes the DTL. The prism logic derives the location of a database fragment from the call characteristics (e.g., DNIS, ANI, OCN, PIN, or password) of an incoming call. These characteristics are typically represented by a string of digits. If the DTL does not have a complete string of digits, then the DTL, at step 140, outputs a request for an additional digit. If the DTL has a complete string of digits and determines that the transaction request is invalid (FIG. 9), then the DTL, at step 142, outputs an invalid signal to the prism logic which, in turn, outputs an invalid signal to the SSP (FIG. 7, step 118). If the DTL derives the location of the database fragment (FIG. 9), then the DTL outputs the address of the fragment to the prism logic.

After the prism logic receives the database fragment address, the prism logic, at step 144, queries the relevant database 146 and receives the information stored on the database fragment (e.g., calling card balance). If the prism logic determines that the received information permits the caller to make a call, then the prism logic, at step 148, outputs a valid signal and a password, if applicable, to the SSP.

Figure 9:
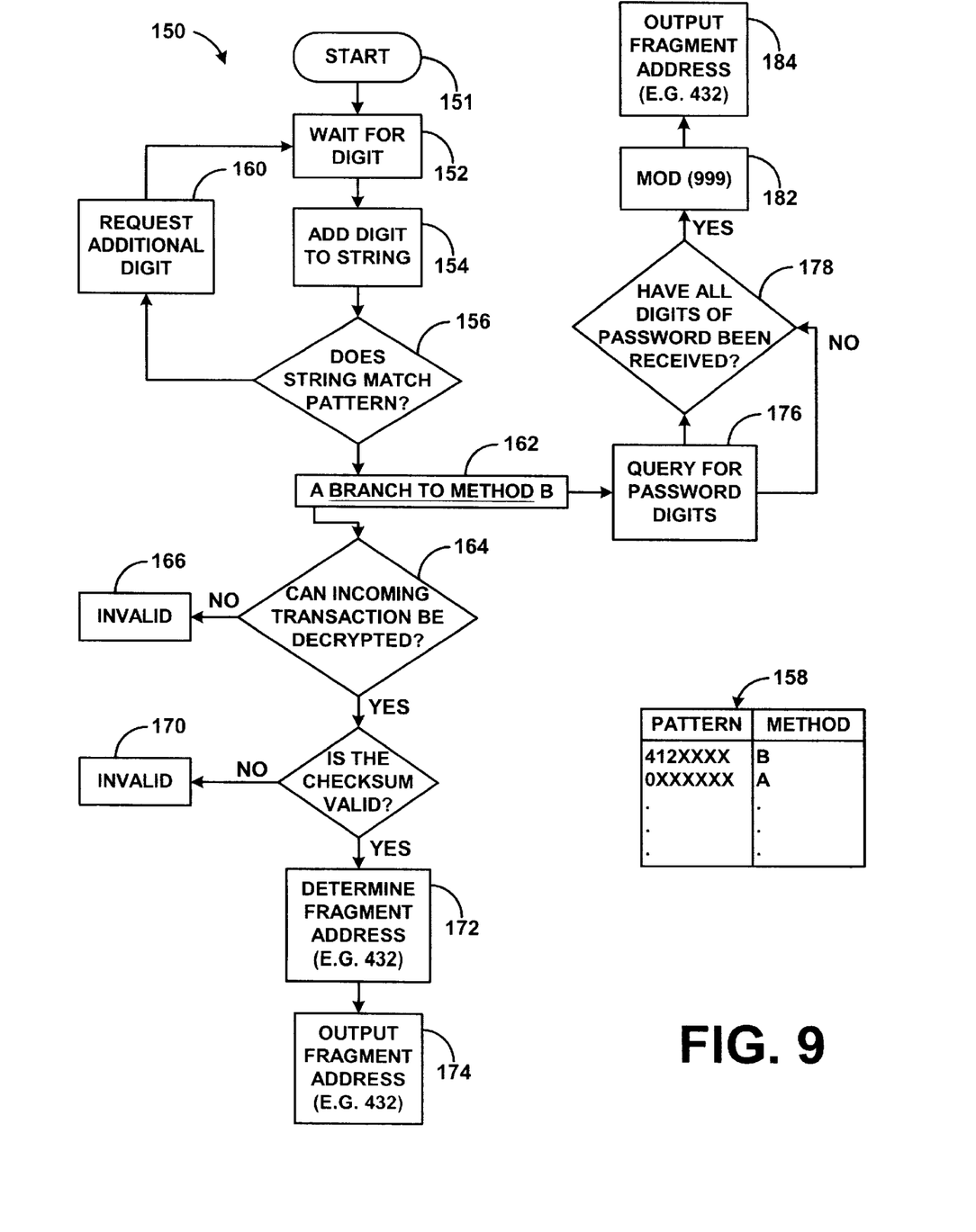
FIG. 9 is a flowchart illustrating the execution of the DTL in the dynamic transaction network of the present invention.

Referring now to FIG. 9, one method 150 of DTL execution is shown. Initially, at step 151, the DTL begins to receive a string of digits form the prism logic (FIG. 8, step 138). The DTL waits for a digit, at step 152, and adds the received digit, at step 154 to a digit string. Next, at step 156, the DTL determines if the digit string matches a digit pattern stored in table 158. If the string does not match a stored digit pattern, the DTL, at step 160, requests an additional digit and, at step 152, waits for the requested digit. If the digit string matches a stored digit pattern, the DTL, at step 162, branches to a stored method of call control corresponding to the matching digit pattern.

If the DTL branches to method "A", the DTL, at step 164, attempts to decrypt the incoming transaction request. If the DTL is unable to decrypt the transaction request, the DTL, at step 166, outputs an invalid signal to the prism logic. If the DTL successfully decrypts the transaction request, the DTL, at step 168, determines whether the checksum is valid. If the checksum is invalid, the DTL, at step 170, outputs an invalid signal to the prism logic. If the checksum is valid the DTL, at step 172, derives the database fragment address corresponding to the transaction request and, at step 174, outputs the address to the prism logic.

If the DTL branches to method "B", the DTL, at step 176, queries the caller, via the prism logic and SSP, for password digits. Alternatively, the DTL may detect a password portion of the incoming call characteristics. Next, at step 178, the DTL determines whether the complete password is received. If the password is only partially received, the DTL returns to step 176 and queries the caller for additional digits. If the complete password is received the DTL transmits the password to the SSP which, in turn, determines if the password is valid (FIG. 7, step 126). Turning now to step 182, the DTL derives the database fragment address corresponding to the transaction request by dividing the PIN number by an integer, such as 999, and using the remainder to determine the relevant database fragment address. Next, at step 184, the DTL outputs the address to the prism logic.

A general description of the apparatus and method of the present invention as well as preferred embodiments of both has been set forth above. One skilled in the art will recognize and be able to practice many changes in many aspects of the apparatus and method described above, including variations which fall within the scope of the invention, as defined by the appended claims. For example, the present invention disclosed herein utilizes telecommunications terms since that is the initial objective of the present invention. However, many of the OLTP problems solved with this invention will apply to other industries.

What is claimed is:

1. A dynamic transaction network, comprising:
   a management station containing pre-defined transportable logic that facilitates access to the dynamic transaction network, wherein the management station automatically updates the transportable logic stored therein in real time in response to a change in a structure of the dynamic transaction network;
   a database connected to the management station through a communications medium, the database having at least one database fragment stored therein, wherein the database is capable of periodically contacting the management station to ensure that the database is storing necessary database fragments; and
   a terminal connected to the management station through the communications medium, the terminal receiving the pre-defined transportable logic from the management station upon initialization of the dynamic transaction network, the terminal accessing the database fragment via the pre-defined transportable logic in response to a transaction request from a user.

2. The dynamic transaction network of claim 1, wherein the change in the structure is an addition of a terminal to the dynamic transaction network.

3. The dynamic transaction network of claim 1, wherein the change in the structure is a removal of a terminal from the dynamic transaction network.

4. The dynamic transaction network of claim 1, wherein the change in the structure is an addition of a database to the dynamic transaction network.

5. The dynamic transaction network of claim 1, wherein the change in the structure is a removal of a database from the dynamic transaction network.

6. The dynamic transaction network of claim 1, wherein the change in the structure is an addition of a database fragment to the dynamic transaction network.

7. The dynamic transaction network of claim 1, wherein the change in the structure is a removal of a database fragment to the dynamic transaction network.

8. The dynamic transaction network of claim 1, wherein the change in the structure is a migration of a database fragment from a first database to a second database.

9. The dynamic transaction network of claim 1, wherein the terminal replaces the transportable logic stored therein with the updated transportable logic stored in the management station in response to a determination that there is a difference between the transportable logic stored therein and the updated transportable logic stored in the management station.

10. The dynamic transaction network of claim 9, wherein the determination is made by the terminal after a comparison of the transportable logic stored therein and the updated transportable logic stored in the management station.

11. The dynamic transaction network of claim 1, wherein the terminal updates the transportable logic stored therein with the transportable logic stored in the management station in response to a determination that there is a difference between the transportable logic stored therein and the transportable logic stored in the management station.

12. The dynamic transaction network of claim 11, wherein the determination is made by the terminal after a comparison of the transportable logic stored therein and the transportable logic stored in the management station.

13. The dynamic transaction network of claim 1, wherein the network is a Pre-Paid Calling Card (PPCC) network.

14. The dynamic transaction network of claim 1 wherein the transportable logic locates a database fragment corresponding to the transaction request based on an input provided by the transaction request.

15. The dynamic transaction network of claim 14 wherein the input is an automatic number indicator of an inbound call to the terminal.

16. The dynamic transaction network of claim 14 wherein the input is a dialed number identification system of an inbound call to the terminal.

17. The dynamic transaction network of claim 14, wherein the input is an originally called number of an inbound call to the terminal.

18. The dynamic transaction network of claim 14 wherein the input is a redirect number of an inbound call to the terminal.

19. The dynamic transaction network of claim 14 wherein the input is a user input to the terminal.

20. The dynamic transaction network of claim 19 wherein the user input is a PIN.

21. The dynamic transaction network of claim 19 wherein the user input is a account number.

22. The dynamic transaction network of claim 19 wherein the user input is a PIN derived via voice processing.

23. The dynamic transaction network of claim 19 wherein the user input is an account number derived via voice processing.

24. The dynamic transaction network of claim 19 wherein the user input is a PIN derived via processing DTMF signals.

25. The dynamic transaction network of claim 19 wherein the user input is an account number derived via processing DTMF signals.

26. The dynamic transaction network of claim 14 wherein the input is an address of a terminal port that an inbound call arrived on.

27. The dynamic transaction network of claim 14 wherein the input is a time of day that an inbound call arrived at the terminal.

28. The dynamic transaction network of claim 14 wherein the input is an indication of a type of terminal that generated the inbound call.

29. The dynamic transaction network of claim 14 wherein the transportable logic locates the database fragment corresponding to the transaction request and provides a database address of the fragment.

30. The dynamic transaction network of claim 29 wherein the transportable logic locates the database fragment corresponding to the transaction request and provides a database key for accessing the fragment in the database.

31. The dynamic transaction network of claim 14 wherein the transportable logic locates the database fragment corresponding to the transaction request and provides a database key for accessing the fragment in the database.

32. A dynamic transaction network, comprising:
   a management station containing system configuration data that defines the dynamic transaction network and pre-defined Dynamic Transportable Logic (DTL) that facilitates access to the dynamic transaction network, wherein the management station automatically updates the DTL stored therein in real time in response to a change in a structure of the dynamic transaction network;
   a database connected to the management station through a communications medium, the database having at least one database fragment stored therein, wherein the database is capable of periodically contacting the management station to ensure that the database is storing necessary database fragments; and
   a terminal connected to the management station through the communications medium, the terminal receiving the system configuration data and the pre-defined DTL from the management station upon initialization of the dynamic transaction network, the terminal accessing the database fragment via the pre-defined DTL in response to a transaction request from a user.

33. The dynamic network of claim 32, wherein the change in the structure is an addition of a terminal to the dynamic transaction network.

34. The dynamic transaction network of claim 32, wherein the change in the structure is a removal of a terminal from the dynamic transaction network.

35. The dynamic transaction network of claim 32, wherein the change in the structure is an addition of a database to the dynamic transaction network.

36. The dynamic transaction network of claim 32, wherein the change in the structure is a removal of a database from the dynamic transaction network.

37. The dynamic transaction network of claim 32, wherein the change in the structure is an addition of a database fragment to the dynamic transaction network.

38. The dynamic transaction network of claim 32, wherein the change in the structure is a removal of a database fragment to the dynamic transaction network.

39. The dynamic transaction network of claim 32, wherein the change in the structure is a migration of a database fragment from a first database to a second database.

40. The dynamic transaction network of claim 32, wherein the terminal replaces the system configuration data and the DTL stored therein with the updated system configuration data and the updated DTL stored in the management station in response to a determination that there is a difference between the system configuration data and the DTL stored therein and the updated system configuration data and the updated DTL stored in the management station.

41. The dynamic transaction network of claim 40, wherein the determination is made by the terminal after a comparison of the system configuration data and the DTL stored therein and the updated system configuration data and the updated DTL stored in the management station.

42. The dynamic transaction network of claim 32, wherein the terminal updates the system configuration data and the DTL stored therein with the system configuration data and the DTL stored in the management station in response to a determination that there is a difference between the system configuration data and the DTL stored therein and the system configuration data and the DTL stored in the management station.

43. The dynamic transaction network of claim 42, wherein the determination is made by the terminal after a comparison of the system configuration data and the DTL stored therein and the system configuration data and the DTL stored in the management station.

44. The dynamic transaction network of claim 32, wherein the network is a Pre-Paid Calling Card (PPCC) network.

45. The dynamic transaction network of claim 32 wherein the DTL locates a database fragment corresponding to the transaction request based on an input provided by the transaction request.

46. The dynamic transaction network of claim 45 wherein the input is an automatic number indicator of the inbound call to the terminal.

47. The dynamic transaction network of claim 45 wherein the input is a dialed number identification system of an inbound call to the terminal.

48. The dynamic transaction network of claim 45, wherein the input is an originally called number of an inbound call to the terminal.

49. The dynamic transaction network of claim 45 wherein the input is a redirect number of an inbound call to the terminal.

50. The dynamic transaction network of claim 45 wherein the input is a user input to the terminal.

51. The dynamic transaction network of claim 50 wherein the user input is a PIN.

52. The dynamic transaction network of claim 50 wherein the user input is a account number.

53. The dynamic transaction network of claim 50 wherein the user input is a PIN derived via voice processing.

54. The dynamic transaction network of claim 50 wherein the user input is an account number derived via voice processing.

55. The dynamic transaction network of claim 50 wherein the user input is a PIN derived via processing DTMF signals.

56. The dynamic transaction network of claim 50 wherein the user input is an account number derived via processing DTMF signals.

57. The dynamic transaction network of claim 45 wherein the input is an address of a terminal port that an inbound call arrived on.

58. The dynamic transaction network of claim 45 wherein the input is a time of day that an inbound call arrived at the terminal.

59. The dynamic transaction network of claim 45 wherein the input is an indication of a type of terminal that generated the inbound call.

60. The dynamic transaction network of claim 45 wherein the DTL locates the database fragment corresponding to the transaction request and provides a database address of the fragment.

61. The dynamic transaction network of claim 60 wherein the DTL locates the database fragment corresponding to the transaction request and provides a database key for accessing the fragment in the database.

62. The dynamic transaction network of claim 45 wherein the DTL locates the database fragment corresponding to the transaction request and provides a database key for accessing the fragment in the database.

* * * * *